Nov. 15, 1932.  F. KEIDEL  1,887,557
SEAL
Filed June 29, 1931

INVENTOR
Frank Keidel
BY
ATTORNEYS

Patented Nov. 15, 1932

1,887,557

UNITED STATES PATENT OFFICE

FRANK KEIDEL, OF ELMHURST, NEW YORK, ASSIGNOR TO THE INTERNATIONAL SEAL AND KNOT PROTECTOR CO., OF NEW YORK, N. Y., A CORPORATION OF NEW YORK

SEAL

Application filed June 29, 1931. Serial No. 547,679.

The present invention relates to a sealing device, and more particularly to a type which is adapted to enclose, protect and seal knots, loops, or the heads of fastening elements, such as screws, nuts, bolts and the like.

One object of the present invention is to provide a sealing device of simple construction and economical to manufacture, the elements of which can be assembled by simple finger manipulations without the use of tools, and which when assembled, form a closed chamber for enclosing the object to be sealed, these elements cooperating so that they cannot be separated without mutilation or affording evidence of tampering.

In carrying out my invention I employ a pair of complementary cup-like members adapted to be telescoped to form a closed chamber.

As an important feature of my invention the members are interlocked solely through frictional engagement of the surfaces of the peripheral walls. The inner member goes entirely within the outer member, whereby no part of the inner member may be engaged or gripped to pull the inner member out and separate the members. To insure against the removal of the inner member when once assembled, it is preferable that the end wall thereof be disposed below the rim of the outer member. These two complementary cup-like members form a chamber which may enclose and seal the knots of strings and the like. The invention is particularly adapted to protect and seal the head of a fastening member, such as a screw, against tampering, and for that purpose the end wall of the outer member is provided with an aperture through which the body of the fastening element extends, the aperture being smaller than said head, so that the edge of the metal around the opening engages the inner surface of said head. The device may be used for protecting boxes during shipment or storage, against tampering, or may be used to prevent casings enclosing gasoline pumps, governors, gearing and the like from being meddled with.

Figure 1:
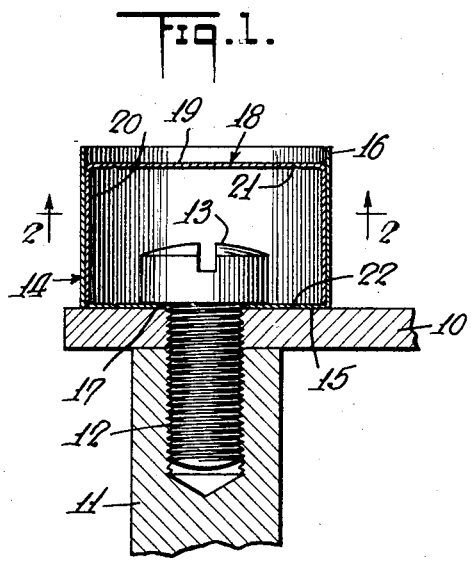
Figure 2:
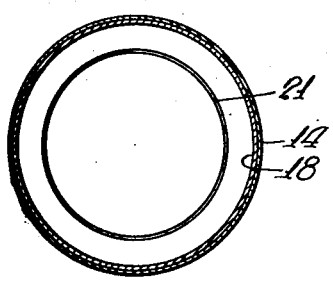

In the accompanying drawing there is shown for the purpose of illustration, merely one form or embodiment which the present invention may assume, and in which Fig. 1 is a central longitudinal section taken through the sealing device enclosing the head of a machine screw, and Fig. 2 is a section taken on the line 2—2 of Fig. 1.

Although the invention is shown as adapted to enclose and seal the head of a fastening member, such as a screw, against tampering, it is obvious that so far as the broader aspects of the invention are concerned, the device may be used as a seal for such other purposes as the sealing of the knots of strings or the like.

As an example of the adaptability of the sealing device of the present invention, there are shown two plates 10 and 11 which may constitute the walls of a casing for enclosing a meter, pump or other apparatus or part to be protected. These walls 10 and 11 may be held together by a series of fastening elements, one of which is shown in the form of a machine screw 12 having a screw head 13. The sealing device is employed to seal and protect the head 13 so that the head cannot be engaged by a screw driver or the like to remove the screw without mutilating or destroying the seal. The sealing device comprises a cup member 14, preferably made of thin metal, and preferably stamped or drawn into shape to provide a flat end wall 15 and a cylindrical peripheral wall 16. The end wall 15 has an aperture 17 for receiving the threaded body portion of the screw 12, said aperture being smaller than the head 13 so as to prevent the separation of the member 14 from said screw while the screw is in place. In mounting the member 14 in position, said member is disposed as shown in Fig. 1, with the end wall 15 lying against the plate 10, and the screw 12 is passed through the aperture 17 and turned until said screw is tight in position.

In order to protect the screw head 13 against tampering, there is provided a cup-like member 18 preferably stamped from thin metal to form an end wall 19, and a cylindrical peripheral wall 20. This member 18 is adapted to be forced by gentle pressure inside of the cup member 14 with the end wall 19 closing the chamber therein. The peripheral walls of the two members are of such sizes that a snug frictional engagement is effected therebetween. The depth of the cup member 18 is slightly less than that of the cup member 14, so that the outside surface of the end wall 19 may be moved to a position below or within the rim of the member 14, so that no part of said member 14 can be gripped and pulled out of the member 18.

In order to facilitate the breaking of the seal and to permit access to the screw head 13, the sealing device is preferably provided with a weakened line along which a portion of the wall of said device may be easily broken. For instance, the end wall 19 may have an annular groove 21 adjacent to the intersection of the side and end walls whereby the center portion of said end wall may be broken inwardly or may be forced outwardly by compressing the peripheral wall. The metal will break along the weakened line 21 if the seal be gripped so tightly with a pair of pliers as to force any portion of the side walls inwardly in respect to the end wall. This groove 21 may be provided on the outside surface of the end wall 19, but it is advantageous to provide it on the inside surface thereof, as shown. The weakened line may be in the end wall or side wall of the member 14. Said member 14 is shown as provided with a groove 22 in the inside surface of the end wall 15. The seal may be easily broken by gripping the outside of the member 14 by means of a pair of pliers or the like, and pulling on it to break said member along the groove 22.

My improved seal is very simple and very economical to construct, and is also very easy to assemble, the only operation necessary for assembling the seal being the insertion of the member 18 into telescopic position with the member 14. The walls of the device are so thin that an attempt to insert a tool between the telescoped cylindrical surfaces of the two members 14 and 18 will cause the distortion or breaking of one or the other of said members, and will leave telltale evidence of such tampering. Also, by making the cup-like member 18 of a size sufficient to prevent the projection of the end thereof beyond the open end of the member 14, the possibility of gripping the end of the member 18 and effecting its detachment from the member 14 by mere pulling manipulation is eliminated. Each member may be formed by a single operation of a simple and inexpensive die, and thin metal may be employed, so that the parts may be made at very low cost.

The construction shown in the drawing is on an enlarged scale to facilitate a clear understanding of the construction. In commercial practice the seals are made in accordance with the size of the screw to be protected. For an ordinary small wood screw the members of the seal might be approximately one-half inch in diameter and about five-sixteenths of an inch in height.

Having thus described my invention, what I claim as new and desire to secure by Letters Patent is:

A sealing device of the class described, consisting of a pair of cup-like members having end and peripheral walls of thin sheet metal, the diameter of the peripheral wall of one of said members being slightly less than that of the other member thereby permitting telescoping and snug frictional engagement of the said members, the peripheral wall of the inner member being provided with a continuous peripherally uninterrupted edge portion adapted to directly abut the end wall of the outer member without distortion when they are in sealing relationship, and one of said members having an annular weakened line closely adjacent to the intersection of the peripheral wall and the end wall and adapted to break upon the application of pressure tending to collapse the seal or separate said members from telescoping relationship.

Signed at New York in the county of New York and State of New York this 25th day of June A. D. 1931.

FRANK KEIDEL.